United States Patent [19]
Weddle

[11] 4,302,024
[45] Nov. 24, 1981

[54] FLORAL CART
[76] Inventor: Carol D. Weddle, 111 W. Juniper St., Brea, Calif. 92621
[21] Appl. No.: 101,205
[22] Filed: Dec. 7, 1979
[51] Int. Cl.³ .............................................. B62B 1/26
[52] U.S. Cl. .................................... 280/47.33; 47/84; 206/423; 220/22.5; 280/47.26; 280/79.1 A; 410/150
[58] Field of Search ............... 280/47.26, 47.19, 47.18, 280/47.33, 79.3, 79.1 A, 79.2, 47.13 R, 33.99 T; 220/22.5, 22.1; 410/143-152; D12/21, 32; 206/423, 45.14, 45.15; 47/73, 84, 39

[56]  References Cited
U.S. PATENT DOCUMENTS

| 1,970,727 | 8/1934 | Bates | 280/47.26 |
| 2,468,101 | 4/1949 | Nampa | 410/150 |
| 2,597,544 | 5/1952 | Swain | 280/47.19 |
| 2,646,903 | 7/1953 | Draper | 220/22.5 |
| 3,191,960 | 6/1965 | Turner | 280/47.19 |
| 3,762,097 | 10/1973 | Gallo | 410/151 |
| 3,971,160 | 7/1976 | Vajtay | 206/423 |

OTHER PUBLICATIONS

"Aluminum Flower Caddy", Exhibit A in Applicants Prior Art Statement Filed Mar. 11, 1980.

Primary Examiner—David M. Mitchell
Attorney, Agent, or Firm—Lyon & Lyon

[57] ABSTRACT

There is disclosed herein a cart for transporting floral baskets, pots, sprays, wreaths, and the like conveniently and easily by one person. The cart comprises an elongated frame structure having a bottom, two sides and a front, along with a pair of wheels disposed at the front and support legs arranged near the rear of the cart. The sides form a pair of longitudinal channels for adjustably receiving a plurality of transverse rails. The transverse rails provide secure compartments for the floral baskets or pots during transportation. The frame structure also may include longitudinal dividers to form individual compartments for the baskets. Side frames also can be provided.

8 Claims, 5 Drawing Figures

FLORAL CART

The present invention relates to carts and the like, and more particularly to an improved floral cart construction for transporting floral baskets, pots, sprays, wreaths and the like, for use in conjunction with funerals where it is necessary to transport floral arrangements to a church, mortuary or cemetery.

BACKGROUND OF THE INVENTION

Various types of devices and carts have been developed for transporting floral baskets, pots, and the like. The more refined devices of this nature comprise a frame structure forming a bottom and four sides, and having wheels for enabling the device to be readily moved from one location to another. While prior art devices of this nature can hold and transport a large number of floral arrangements, one of the main disadvantages thereof is that if they are not completely filled, flower baskets or pots tend to slide around or fall over and there is no convenient means for accommodating less than a full load without encountering this difficulty. Additionally, prior carts generally are relatively heavy, and also cannot be conveniently stacked for storage.

Accordingly, it is a principal object of the present invention to provide an improved form of floral cart having adjustable compartments.

Another object of this invention is to provide a floral cart having simple adjustable dividers which function to form compartments for floral arrangements and to secure the arrangements within the cart during transportation.

These and other objects and features of this invention will become better understood through a consideration of the following description taken in conjunction and with the drawings in which:

DESCRIPTION OF THE PREFERRED EMBODIMENT

Figure 1:
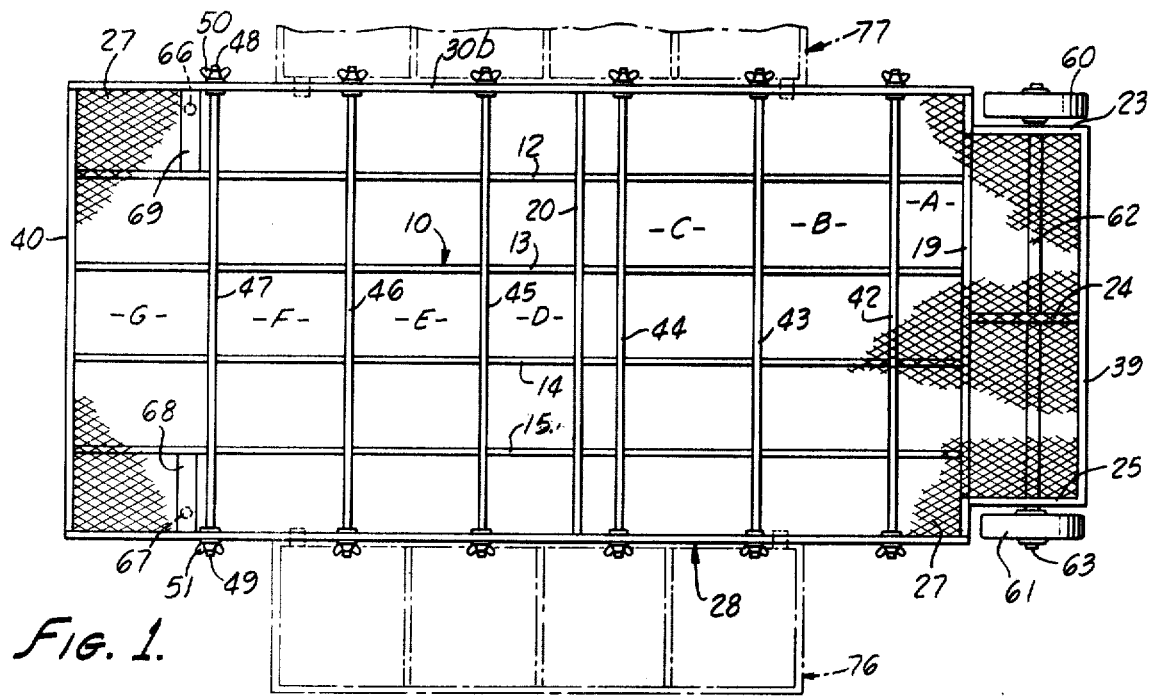
FIG. 1 is a plan or top view of a floral cart according to the present invention.
Figure 2:
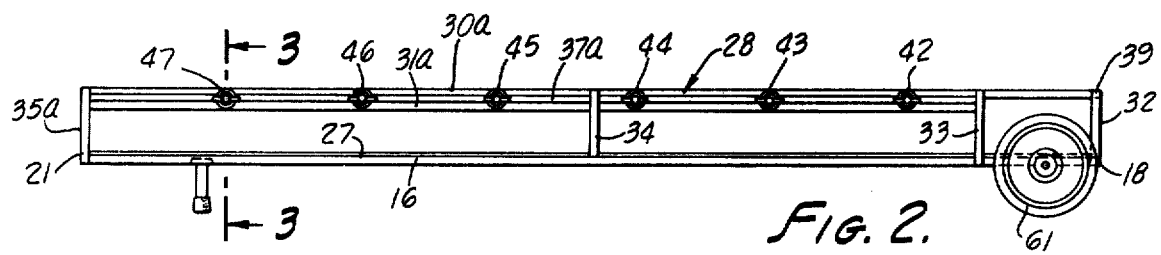
FIG. 2 is a side elevational view of the cart.
Figure 3:
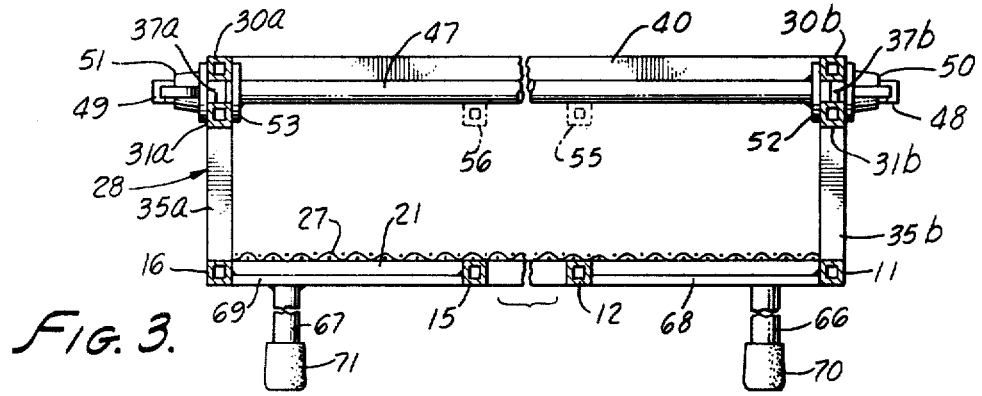
FIG. 3 is a sectional view taken along a line 3—3 of FIG. 2.

Turning now to the drawings, the floral cart as seen in FIGS. 1 through 3 comprises a bottom frame 10 formed of six longitudinal tubes 11 through 16 (the outermost bottom tubes 11 and 16 are obscured by side tubes in FIG. 1 but they are seen in FIG. 3), and four transverse tubes 18 through 21 (tubes 18 and 21 are obscured in FIG. 1 but can be seen in FIG. 2). Additionally, the bottom frame 10 includes three sections of tubes 23 through 25 extending longitudinally between transverse tubes 18 and 19 at the forward end of the cart. A layer of expanded metal 27 completely covers the bottom frame 10. The frame structure formed by the longitudinal tubes 11 through 16, transverse tubes 18 through 21 and tube sections 23 through 25 is welded together, and the expanded metal 27 is welded on top of this frame structure to form the bottom frame 10.

The cart includes two side frames also in the form of tubing. Both sides are like that shown in FIG. 2, which shows the right side 28 of the cart (when viewed from the rear), and the left side of the cart is a mirror image thereof. The right side 28 is formed from the longitudinal tube 16 of the bottom frame, a pair of parallel tubes 30 and 31, and four vertical tubes 32 through 35. These tubes are welded together in the configuration shown. The upper pair of tubes 30 and 31 form an open channel 37 extending along the length of the cart, the right side channel being designated 37a and the left side channel being designated 37b as best seen in FIGS. 2 and 3. The front and rear ends of the cart are formed by the lower transverse tubes 18 and 21 and upper transverse tubes 39 and 40. These ends also may include vertical tubes (not shown) intermediate the sides of the cart for providing greater rigidity. The forward end of the cart preferably is formed at a right angle to the bottom frame as best seen in FIG. 2 to allow the cart to be stacked on this end for storage when not in use.

The floral cart further includes six adjustable transverse rails 42 through 47. Each of these rails is identical, and only one will be described in detail. The ends of the rail 47 are threaded at 48-49 and receive respective wing nuts 50 and 51 (note FIG. 3). A pair of flat washers 52 and 53 are welded to the rod 47 intermediate the ends thereof at a position such that they essentially abut the inner surfaces of the pairs of upper longitudinal tubes 30a, 31a and 30b, 31b as best seen in the cross-sectional view of FIG. 3. The ends of the rail 47 extend through the respective channel 37a, 37b, and the rod 47, as well as the rods 42-46, may be adjustably moved toward the front or rear of the cart to form compartments as identified A, B, C, D, E, F, and G as best seen in FIG. 1. Positioning of these rails 42-47 determines the sizes of these compartments, and the positions thereof are selected according to the sizes of the baskets, pots, sprays, and the like to be transported. Once adjusted, the wing nuts 50, 51 are tightened to secure the rods in the selected positions, although they may be readjusted from time to time as desired. The compartments A-G may further be subdivided, if desired, by locating several additional longitudinal tubes between the sides and welding the ends of these tubes to transverse tubes 39 and 40. Two exemplary tubes of this nature are indicated by phantom lines 55-56 in FIG. 3.

A pair of conventional wheels 60-61 with plastic or rubber tires are provided at the front end of the cart to allow it to be easily transported. A hollow pipe 62 (FIG. 1) is welded to the bottom frame 10 to the tube sections 23-25. An axle 63 extends through this pipe 62, and the wheels 60-61 are attached to the ends of the axle 63 in any convenient manner, as with washer bushings and cotter pins. The front end of the cart preferably extends slightly past the wheels 60-61 to facilitate stacking the cart on this end. A pair of legs 66-67 are provided toward the rear end of the cart. These legs 66-67 are welded to respective plates 68-69, and these plates are welded between longitudinal tubes 11-12 and 15-16 as best seen in FIG. 3. Rubber tips 70 and 71 are provided on the lower ends of the respective legs 66-67. Each of the various tubes comprising the bottom frame, sides and ends preferably is one-half inch square hollow steel tube having a wall thickness of 0.065 inch. This size tube has been found to be of sufficient strength, given the welded construction of the frame tubes and expanded metal bottom, for allowing approximately forty basket arrangements to be readily transported in the present cart by one person. An exemplary size for a cart of the present invention is thirty-six inches wide, eighty inches long and six inches deep. This size cart conveniently fits into a standard van or wagon, and a pair of "U" shaped ramps can be used to allow one person to load and unload the cart.

Figures 4, 5:
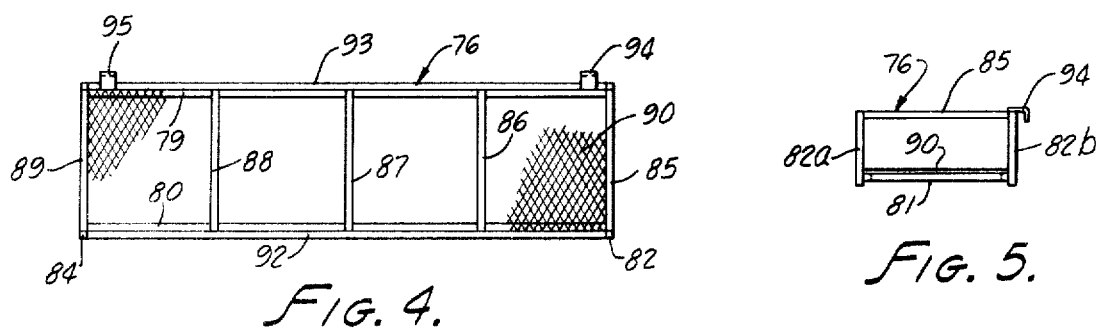
FIGS. 4 and 5 are respectively a plan view and an end view of attachable side baskets which are diagrammetically illustrated in the view of the cart of FIG. 1.

Additionally, side baskets 76 and 77 which are diagrammetically illustrated in FIG. 1 and shown in greater detail in FIGS. 4 and 5 have been found to be useful. Each of these baskets can hold four additional arrangements, and they can be carried separately or can be attached to the sides of the cart as diagrammetically illustrated in FIG. 1. These side baskets 76 and 77, which may measure approximately twelve inches wide, forty-two inches long, and six inches high, likewise can be of a welded tube construction like the cart. They include a base formed of two longitudinal tubes 79-80 and end tubes 81-82 (only the forward end tube 81 being seen in FIGS. 4-5). The sides comprise three vertical tubes 82-84 (center vertical tube 83 being obscured in FIGS. 4-5). Five top transverse tubes 85-89 and two top longitudinal tubes 92-93 form the four floral compartments. The bottom of the baskets 76 and 77 likewise have expanded metal 90 welded thereto forming a bottom surface. Clips 94-95 are welded to the in-board longitudinal top tube 93 to allow the baskets to be clipped into the channel 37 formed by the longitudinal tubes 30-31 of the cart.

While a single preferred embodiment has been described and illustrated, it will be apparent to those skilled in the art that changes and variations can be made therein without departing from the spirit and scope of the present invention.

What is claimed is:

1. A floral cart for transporting a plurality of floral baskets, pots, sprays, and the like comprising
a bottom substantially planar and substantially rectangular frame formed from a plurality of longitudinal tubes and a plurality of transverse tubes welded together to form the bottom frame, and support material welded to and substantially covering the bottom frame to provide a support surface,
right and left side frames secured to the bottom frame and extending upwardly therefrom at substantially right angles, each of said side frames including longitudinal tubes, one tube disposed above another and vertically spaced apart to form upper longitudinal channels extending along the sides of the floral cart,
tube means secured at the ends of said cart to said side frames to form front and rear ends of the cart,
a wheel assembly comprising a pair of wheels affixed to the bottom frame near the front of the cart, and leg means secured to the bottom frame near the rear end of the cart, and
a plurality of adjustable transverse rails having ends aligned along an axis the same as or parallel to that of its respective transverse rail and adapted to fit within the upper longitudinal channels formed in the side frames, said rails including means for locking said rails to the tubes forming the upper longitudinal channels in the side frames to form adjustable compartments in said cart, said locking means being aligned along said axis.

2. A floral cart as in claim 1 wherein
said support material comprises expanded metal welded to said bottom frame.

3. A floral cart as in claim 1 wherein
said tube means secured at the ends of said cart to said side frames form front and rear ends of the cart extending upwardly from the bottom frame at substantially right angles to allow the cart to be stacked on either end, and the front end of the cart extending forwardly of the outer circumference of the wheels of said wheel assembly.

4. A floral cart as in claim 1 wherein
each of said adjustable transverse rails include stop means intermediate the ends thereof for essentially abutting the longitudinal tubes of the right and left side frames which form said upper longitudinal channels, said rails further including threaded ends for receiving threaded fasteners for locking said rails to the tubes forming the upper longitudinal channels.

5. A floral cart as in claim 1 including
first and second compartmentalized baskets attached to said respective right and left side frames of said cart.

6. A floral cart as in claim 1 including
a plurality of longitudinal tubes secured between the front and rear ends of the cart intermediate the side frames thereof for subdividing said compartments.

7. A floral cart for transporting a plurality of floral baskets, pots, sprays, or the like comprising
a substantially flat rectangular bottom frame formed of a plurality of longitudinal hollow tubes and a plurality of transverse hollow tubes welded together to form the bottom frame, and expanded metal material welded to and substantially covering the bottom frame to provide a support surface,
right and left side frames welded to the bottom frame and extending upwardly therefrom at right angles, each of said frames including a pair of upper longitudinal hollow tubes one tube disposed above another and vertically spaced apart to form upper longitudinal channels extending along the sides substantially from end to end of the floral cart,
a wheel assembly comprising a pair of wheels affixed to the bottom frame near the front of the cart, and leg means secured to the bottom frame near the rear end of the cart,
hollow tubes welded to said side frames to form front and rear end frames of the cart extending upwardly from the bottom frame at right angles, the front end extending past the forward surface of said wheels, and
a plurality of adjustable transverse rails having ends aligned along an axis the same as or parallel to that of its respective transverse rail and adapted to fit within the upper longitudinal channels formed in the side frames, said rails including stop means for essentially abutting the inner surfaces of the tubes forming the upper longitudinal channels in the side frames and threaded outer ends and fasteners for locking the rails to said tubes forming the upper longitudinal channels to form adjustable compartments in said cart, said stop means said threaded outer ends and said fasteners all being aligned on said axis.

8. A floral cart for transporting a plurality of floral baskets, pots, sprays, or the like comprising
a substantially flat rectangular bottom frame formed of a plurality of longitudinal tubes and a plurality of transverse tubes secured together to form the bottom frame, and support material secured to and substantially covering the bottom frame to provide a support surface, right and left side frames secured to the bottom frame and extending upwardly therefrom at substantially right angles, each of said side frames including a pair of upper longitudinal tubes one tube disposed above another and vertically spaced apart to form upper longitudinal channels extending along the sides substantially from end to end of the floral cart, wheel assembly means affixed near the front of the cart for facilitating moving the cart, tubes secured to said side frames to form front and rear end frames of the cart extending upwardly from the bottom frame at substantially right angles, and a plurality of adjustable transverse rails having ends aligned along an axis the same as or parallel to that of its respective transverse rail and adapted to fit within the upper longitudinal channels formed in the side frames, said rails including stop means for essentially abutting the inner surfaces of the tubes forming the upper longitudinal channels in the side frames and outer ends for receiving fasteners for locking the rails to said tubes forming the upper longitudinal channels to form adjustable compartments in said cart, said stop means said threaded outer ends and said fasteners all being aligned on said axis.

* * * * *